Patented June 3, 1952

2,598,811

UNITED STATES PATENT OFFICE 2,598,811

POLYMERIZATION OF AROMATIC NITRILES

John E. Mahan and Stanley D. Turk, Bartlesville, Okla., assignors to Phillips Petroleum Company, a corporation of Delaware No Drawing. Application November 26, 1948, Serial No. 62,247

12 Claims. (Cl. 260—248)

This invention relates to the polymerization of aromatic nitriles. This invention is useful for the production of tricyanogen compounds by the polymerization of aromatic nitriles. This invention relates in a specific embodiment to the production of 2,4,6-triphenyl-1,3,5-triazines by the catalytic polymerization of aromatic nitriles.

It is known in the art that aromatic nitriles, such as benzonitrile, can be polymerized to form triazines, but in the methods used heretofore catalytic materials, such as fuming sulfuric acid, bromine, zinc diethyl, and the like, have been employed. The use of such catalytic materials is hazardous and/or expensive, and it is apparent that a method of producing triazines from aromatic nitriles using less dangerous and less expensive catalysts is highly desirable.

It is an object of this invention to polymerize aromatic nitriles in the presence of novel catalysts for the reaction.

Another object of the invention is to provide a novel method for the polymerization of aromatic nitriles to form tricyanogen compounds.

A further object of this invention is to provide novel catalysts for the production of 2,4,6-triphenyl-1,3,5-triazines from aromatic nitriles.

A further object of this invention is to provide a method for polymerizing aromatic nitriles in the presence of relatively small amounts of novel catalysts and at relatively mild and easily controlled reaction conditions.

Additional objects of this invention will be apparent from our disclosure hereinbelow.

We have found that aromatic nitriles can be catalytically polymerized to form tricyanogen compounds in the presence of relatively small amounts of catalysts which have not heretofore been employed for the reaction to be described in detail herein and which eliminate difficulties inherent in the prior art.

The aromatic nitriles that are employed in the practice of our invention may be expressed by the general formula $RC{\equiv}N$ wherein R represents an aryl radical, a naphthyl radical, an anthryl radical, and substituted aryl, naphthyl and anthryl radicals containing at least one substituent group, such as an alkyl group having no more than five carbon atoms in the group, a nitro group or other group that will not hinder polymerization or tend to form products other than the desired reaction products. The $-C{\equiv}N$ group of these aromatic nitriles is attached to one of the ring carbon atoms, and any substituent group that is present is attached to a carbon atom other than the carbon atom to which the $-C{\equiv}N$ group is attached. Benzonitrile is a typical example of these aromatic nitriles. Other examples are 2-methylbenzonitrile, 3-ethylbenzonitrile, 4-butylbenzonitrile, 3-nitrobenzonitrile, 4-ethyl-2-nitrobenzonitrile, 2-nitrobenzonitrile, 2,4-dimethylbenzonitrile, 2,6-dimethylbenzonitrile, 2-methyl-4-ethylbenzonitrile, 1-naphthonitrile, 2-naphthonitrile, 3-naphthonitrile, 3-methyl-1-naphthonitrile, 4-nitro-1-naphthonitrile, 1-cyanoanthracene, 2-cyanoanthracene, 9-methyl-1-cyanoanthracene and 10-nitro-1-cyanoanthracene.

The products that are prepared by our process are tricyanogen compounds or triple polymer products containing the tricyanogen ring and are represented by the following general formula

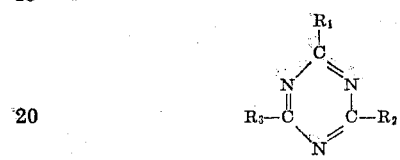

wherein $R_1$, $R_2$ and $R_3$ are within the definition set forth above for R in the general formula for the aromatic nitriles. These products are known as 1,3,5-triazines, and they are soluble in benzene, pyridine, carbon disulfide and moderately soluble in hot toluene. They are of interest as low cost amines capable of a wide variety of valuable uses, such as intermediates in the production of resins, rodenticides, etc.

The reaction that is effected in our process may be expressed by the general equation

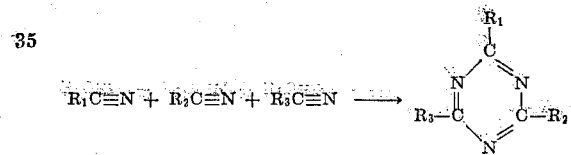

wherein $R_1$, $R_2$ and $R_3$ are within the definition above for R in the general formula for the aromatic nitriles. When $R_1$, $R_2$ and $R_3$ are identical, as in the polymerization of benzonitrile, the reaction may be expressed by the general equation

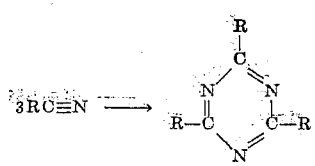

It is also possible that only two of the $R_1$, $R_2$ and $R_3$ radicals may be identical. For example, a mixture of benzonitrile and 2-methylbenzonitrile may be subjected to the reaction conditions to be described hereinbelow, and the principal reaction products will be 1,3,5-triazines in which each of the carbon atoms within the heterocyclic ring has attached to it either a phenyl or a 2-methylphenyl radical, and one of the attached radicals will differ from the other two attached radicals. It is also possible that $R_1$, $R_2$ and $R_3$ are different. For example, a mixture of benzonitrile, 2-methylbenzonitrile and 2-nitrobenzonitrile may be subjected to our reaction conditions and the principal reaction product is a 1,3,5-triazine wherein one carbon atom within the heterocyclic ring has a phenyl radical attached to it, another has a 2-methylphenyl radical attached, and the third has a 2-nitrophenyl radical attached.

The catalysts that may be used to practice our invention are those within the group consisting of the amides and hydrides of alkali metals, such as sodium, potassium and lithium, the hydrides of alkaline-earth metals, such as calcium, barium and strontium, and lithium-aluminum hydride.

The catalysts may be added to the reaction in any suitable form, but it is desirable to use the catalysts in a finely divided or a powdery solid form. If the catalyst can be cut into small pieces, satisfactory results are obtainable in our process by using a catalyst so prepared. Generally, it is best to grind or crush the catalyst in any suitable manner until it is in a powdery form prior to use in our process.

The lithium-aluminum hydride catalyst is the least desirable of the above-mentioned catalysts for our process, but it can be used, if desired. In our process, it is not as effective as the other catalysts because it tends to reduce the aromatic nitriles. This catalyst is available commercially in the solid form, and it has the formula $LiAlH_4$.

The catalyst concentrations that we use in our process are dependent upon the specific catalyst that is employed. In general, the catalyst concentrations are not greater than 4 per cent and within the range of 0.01 to 4 per cent by weight of the nitrile or nitriles being polymerized. Our preferred catalyst concentration is within the range of 0.5 to 2 per cent by weight of the nitrile or nitriles employed.

The nitriles that we use are available commercially, and, if desired, they can be used as obtained. The commercial nitriles contain sufficient water to have an effect upon our process and the results obtainable therefrom. Although it is not necessary, the nitrile may be dried prior to use in our process. Any suitable drying method may be used, such as distillation of the nitriles from phosphorus pentoxide. The nitriles should then be substantially anhydrous, or, more specifically, the water content should not be greater than 0.05 per cent. This percentage is not critical, and our process can be effected with nitriles having a higher water content.

The conditions at which our process is effected are dependent upon the nitrile or nitriles being polymerized. In general, the temperature is within the range of 150 to 550° F., preferably 300 to 500° F. The reaction pressure is also dependent upon the reaction temperature, and it is usually sufficiently high to maintain a liquid phase in the reaction zone, usually from 30 to 500 p. s. i. g. We also prefer to employ a suitable means for agitating the reactant mixture. In small scale or laboratory work, an electrically driven platform rocker provides adequate agitation, but in operations on a larger scale other means, such as electrically driven stirrers or agitators, are more desirable. Suitable solvents, such as pyridine, benzene, paraffinic hydrocarbons and the like may be used. If a solvent is employed, it should be such that liquid phase operation is maintainable under the conditions described.

It will be readily apparent to one skilled in the art that the reaction or contact time should be sufficient to effect the desired polymerization and to provide a high degree of conversion of the nitrile. The contact time will usually fall within the range of 30 minutes to 20 hours.

According to the process of our invention, a selected nitrile or mixture of selected nitriles is heated under sufficient pressure to maintain essentially liquid phase conditions in the presence of extremely small amounts of the catalyst. Heating is sustained for a period of from 30 minutes to 20 hours. In the practice of our invention we have found it convenient to seal the nitrile or nitrile mixture together with the catalyst in a pressure tight reactor and carry out the reaction under the pressure generated at the reaction temperature. Efficient agitation of the system during heating is desirable. When the reaction is complete, the reactor and its contents are cooled to room temperature and the crude product is removed and purified. Purification may be effected by any suitable means; recrystallization from benzene or pyridine has proven satisfactory in many instances.

In the above description of our invention and in the specific example below we have described only a batchwise operation, but our process is readily adaptable to a continuous operation, when desired. Obviously, this latter type of operation will require suitable means for the continuous introduction of reactants to the reaction zone and for the continuous removal of reaction product.

The following example is typical of our process:

*Example*

41.2 grams of benzonitrile, redistilled before use, was charged to a pressure tight reactor. To the charge was added 0.5 gram of sodium hydride (12 grams of sodium hydride per kilogram of benzonitrile) to serve as a catalyst. The temperature was raised to 300 to 350° F. and maintained at that level for 7 hours with continuous agitation. The benzonitrile was converted to 2,4,6-triphenyl-1,3,5-triazine, and a per pass yield of crude triazine of 15.2 grams or 36.8 per cent (based on the benzonitrile charged) was obtained. 24.8 grams of unreacted nitrile was recovered, and an ultimate yield of crude triazine of 93 per cent. The triazine, after purification, had a melting point of 229 to 230° C.

From the above disclosure numerous variations of our process well within the scope of our invention will be obvious to those skilled in the art.

We claim:

1. The process which comprises contacting an aromatic nitrile represented by the formula $RC{\equiv}N$ wherein R is selected from the group consisting of phenyl, naphthyl, anthryl radicals, alkyl substituted phenyl, naphthyl and anthryl radicals wherein the alkyl substituent contains not more than 5 carbon atoms and nitro substituted phenyl, naphthyl and anthryl radicals and wherein the —C≡N group is attached to a ring-carbon atom with a catalytic amount of not more than 4 per cent by weight of a catalyst selected from the group consisting of alkali metal amides and hydrides and alkaline-earth metal hydrides to produce a 1,3,5-triazine.

2. The process which comprises contacting an aromatic nitrile having the general formula $RC\equiv N$ wherein R is an alkyl substituted phenyl radical wherein the alkyl substituent contains not more than 5 carbon atoms and wherein the $-C\equiv N$ group is attached to a ring-carbon atom with no more than four per cent by weight of a catalyst selected from the group consisting of alkali metal amides and hydrides and alkaline-earth metal hydrides to produce a 1,3,5-triazine.

3. The process for preparing 1,3,5-triazines which comprises contacting an aromatic nitrile having the general formula $RC\equiv N$ wherein R is an alkyl-substituted phenyl radical wherein the alkyl substituent contains not more than 5 carbon atoms and wherein the $-C\equiv N$ group is attached to a ring-carbon atom with no more than four per cent by weight of an alkali metal hydride at a temperature within the range of 150 to 550° F.

4. The process for preparing 1,3,5-triazines which comprises contacting an aromatic nitrile having the general formula $RC\equiv N$ wherein R is an alkyl-substituted phenyl radical wherein the alkyl substituent contains not more than 5 carbon atoms and wherein the $-C\equiv N$ group is attached to a ring-carbon atom with no more than four per cent by weight of an alkali metal hydride at a temperature within the range of 150 to 550° F.

5. The process for preparing 1,3,5-triazines which comprises contacting an aromatic nitrile having the general formula $RC\equiv N$ wherein R is a naphthyl radical and wherein the $-C\equiv N$ group is attached to a ring-carbon atom with no more than four per cent by weight of an alkali metal hydride at a temperature within the range of 150 to 550° F.

6. The process for preparing 1,3,5-triazines which comprises contacting an aromatic nitrile having the general formula $RC\equiv N$ wherein R is an anthryl radical and wherein the $-C\equiv N$ group is attached to a ring-carbon atom with no more than four per cent by weight of an alkali metal hydride at a temperature within the range of 150 to 550° F.

7. The process for preparing 1,3,5-triazines which comprises contacting an aromatic nitrile having the general formula $RC\equiv N$ wherein R is an alkyl substituted phenyl radical wherein the alkyl substituent contains not more than 5 carbon atoms and wherein the $-C\equiv N$ group is attached to a ring-carbon atom with from 0.01 to 4.0 per cent by weight of an alkali metal amide at a temperature within the range of 150 to 550° F. and at a pressure sufficient to maintain a liquid phase reaction.

8. The process for preparing 1,3,5-triazines which comprises contacting an aromatic nitrile having the general formula $RC\equiv N$ wherein R is an alkyl substituted phenyl radical wherein the alkyl substituent contains not more than 5 carbon atoms and wherein the $-C\equiv N$ group is attached to a ring-carbon atom with from 0.01 to 4.0 per cent by weight of an alkaline-earth metal hydride at a temperature within the range of 150 to 550° F. and at a pressure sufficient to maintain a liquid phase reaction.

9. The process for preparing 1,3,5-triazines which comprises contacting an aromatic nitrile having the general formula $RC\equiv N$ wherein R is an alkyl substituted phenyl radical wherein the alkyl substituent contains not more than 5 carbon atoms and wherein the $-C\equiv N$ group is attached to a ring-carbon atom with from 0.01 to 4.0 per cent by weight of an alkali metal hydride at a temperature within the range of 150 to 550° F. and at a pressure sufficient to maintain a liquid phase reaction.

10. The process for preparing 1,3,5-triazines which comprises contacting an aromatic nitrile having the general formula $RC\equiv N$ wherein R is an alkyl-substituted phenyl radical wherein the alkyl substituent contains not more than 5 carbon atoms and wherein the $-C\equiv N$ group is attached to a ring-carbon atom with from 0.01 to 4.0 per cent by weight of sodium hydride at a temperature within the range of 150 to 550° F., at a pressure within the range of 30 to 500 pounds per square inch gauge, and for a period of time within the range of 30 minutes to 20 hours.

11. The process for preparing a 1,3,5-triazine which comprises contacting benzonitrile with from 0.01 to 4.0 per cent by weight of sodium hydride at a temperature within the range of 150 to 550° F., at a pressure within the range of 30 to 500 pounds per square inch gauge, and for a period of time within the range of 30 minutes to 20 hours.

12. The process for preparing a 1,3,5-triazine which comprises contacting benzonitrile containing no more than 0.05 per cent water with from 0.01 to 4.0 per cent by weight of sodium hydride at a temperature within the range of 150 to 550° F., at a pressure within the range of 30 to 500 pounds per square inch gauge, and for a period of time within the range of 30 minutes to 20 hours.

JOHN E. MAHAN.
STANLEY D. TURK.

REFERENCES CITED

The following references are of record in the file of this patent:

UNITED STATES PATENTS

| Number | Name | Date |
|---|---|---|
| 1,989,042 | Kunz | Jan. 22, 1925 |

OTHER REFERENCES

Anker: J. Chem. Soc., 1941, pp. 323–331.

Finholt: J. Amer. Chem. Soc., May 1947, pp. 1199–1200.

Gibb: J. of Electro Chemical Society, vol. 93, No. 5, May 1948, pp. 198–211.

Metal Hydrides, "Lithium Aluminum Hydride," 6 pp., February 1950.

Nystrom: vol. 70, J. Amer. Chem. Soc., pp. 3738–3740, November 1948. Effective date, Apr. 30, 1948.

Fuson: "Advanced Organic Chemistry," p. 589, (1950).

Fieser: "Organic Chemistry," p. 846, 2nd ed., (1950).

Karrer: "Organic Chemistry," 2nd ed., pp. 733 and 734, (1946).

Sidgwick: "Organic Chemistry of Nitrogen," pp. 516 and 522, (1942).